April 3, 1956 H. E. MARVEL Re. 24,136

WATER-FUEL SEPARATOR

Original Filed Aug. 25, 1950 2 Sheets-Sheet 1

HARVEY E. MARVEL
INVENTOR.

BY Edmund W. Kamm
ATTORNEY

WATER-FUEL SEPARATOR

Original Filed Aug. 25, 1950 2 Sheets-Sheet 2

HARVEY E. MARVEL
INVENTOR.

BY Edmund W. C. Kamm
ATTORNEY

United States Patent Office

Re. 24,136
Reissued Apr. 3, 1956

24,136

WATER-FUEL SEPARATOR

Harvey E. Marvel, Fort Wayne, Ind., assignor to Bowser, Inc., Fort Wayne, Ind., a corporation of Indiana Original No. 2,725,986, dated December 6, 1955, Serial No. 181,391, August 25, 1950. Application for reissue January 19, 1956, Serial No. 560,190

13 Claims. (Cl. 210—184)

Matter enclosed in heavy brackets [ ] appears in the original patent but forms no part of this reissue specification; matter printed in italics indicates the additions made by reissue.

This invention relates to a separator for removing water from fuels for internal combustion engines.

The separation of water from fuels, particularly aviation gasolines has, for some time, been a problem. Fuel which has even small amounts of water entrained or otherwise contained in it is hazardous because when the temperature of the fuel is lowered, as when an airplane gains altitude, the water crystallizes out of the fuel and plugs screens, filters and other parts of the fuel system of the plane so that power plant failure and destruction of the plane may result. Numerous crashes have occurred in the past, on take off, due to ice in the fuel or due to water in sufficient quantity to starve the engine.

It is an object of this invention to provide practical means for removing water from such fuels.

Another object of the invention is to provide means for removing even small amounts of water from fuels.

A further object of the invention is to provide a structure which will effect such water removal at a relatively high rate of flow.

It is still another object of the invention to provide a separator which will coalesce the fine particles of moisture in a fuel into droplets.

Yet another object of the invention is to provide means for collecting the drops of separted water from the stream of fuel so that they may be disposed of.

It is a further object of the invention to provide a water separator which is dependable and long lived.

Another object of the invention is to direct the separated water to a point where it can be collected and eventually disposed of.

These and other objects will become apparent from a study of this specification and the drawings which are attached hereto and made a part hereof and in which.

Figure 1:
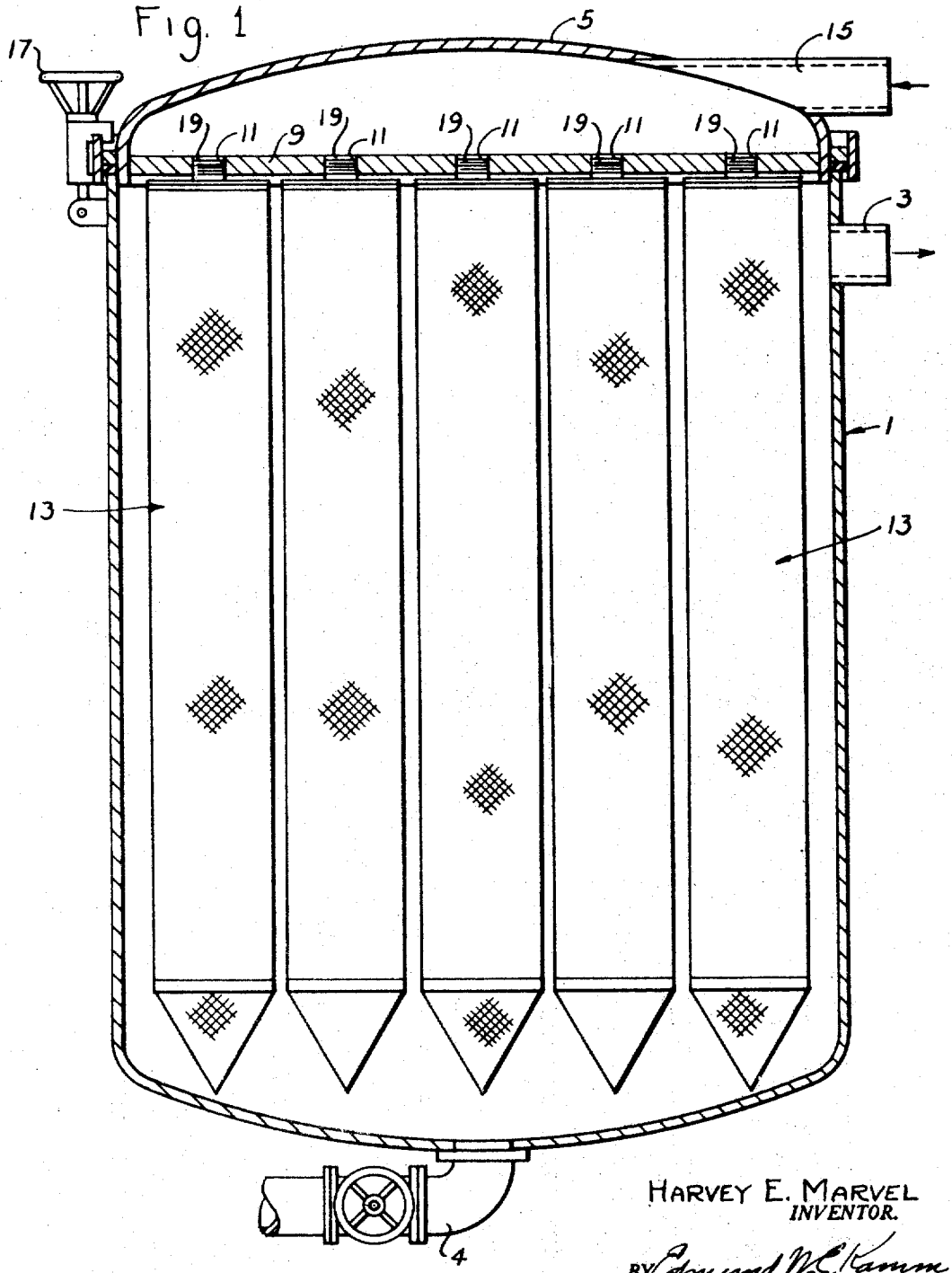
Figure 1 is a vertical sectional view of a tank containing the separator elements.

Referrring first to Figure 1, the numeral 1 represents a tank having an outlet conduit 3, a valved water drain 4, a cover 5 which is removably held in place thereon by clamping means 17' and a deck plate 9 which sealingly engages the wall of the cover.

A number of threaded holes or ports 11 are formed in the deck plate to receive the separator cartridges, designated by numeral 13. The inlet conduit 15 is a part of the cover.

Figure 2:
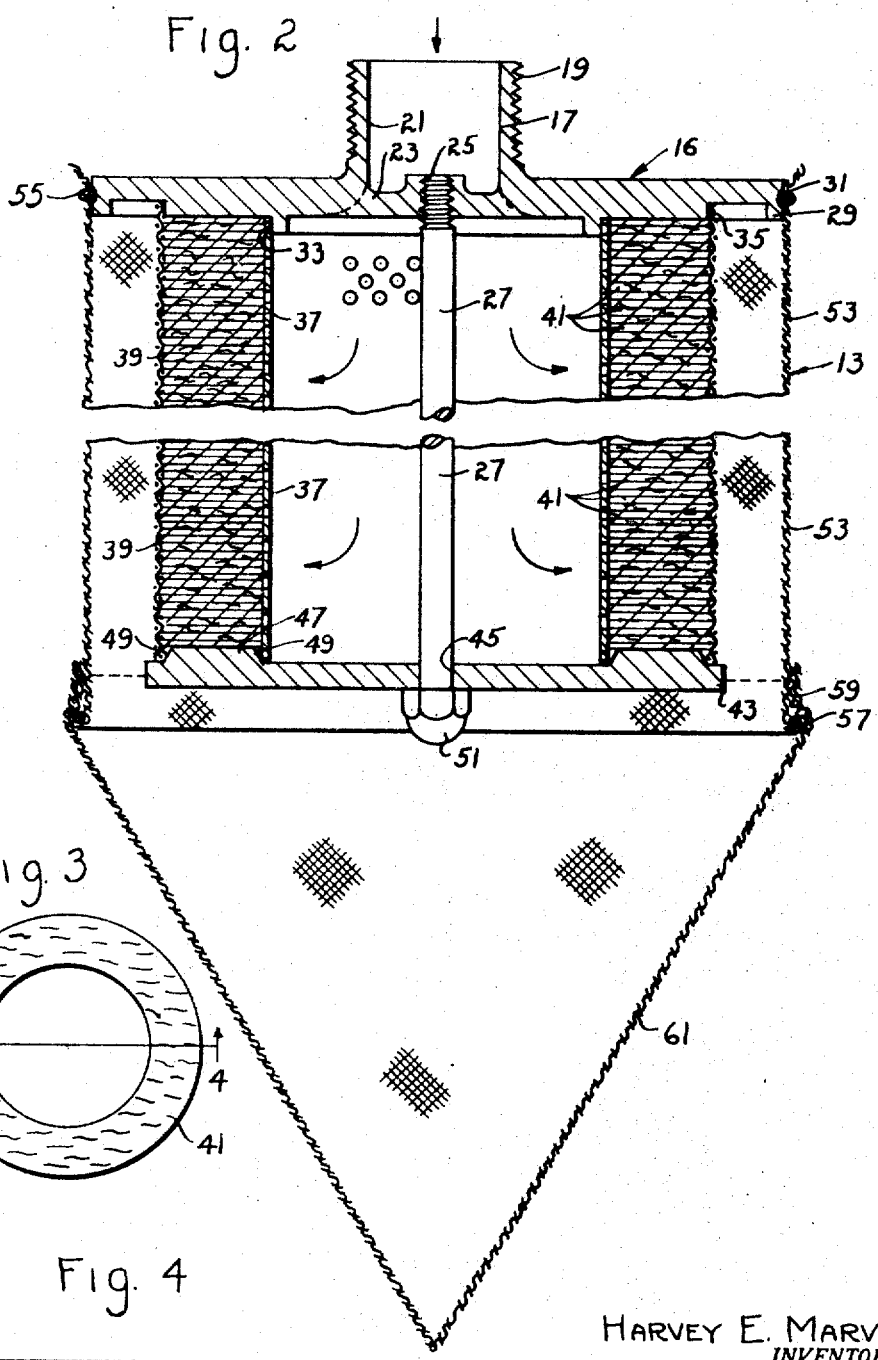
Figure 2 is a vertical sectional view of a separator element.

Referring now to Figure 2, the separator cartridge 13 comprises a head 16 having an inlet neck 17 which is exteriorly threaded at 19 to fit the holes 11 and thus provide an inlet channel 21 to the interior of the separator.

A bar 23 extends across, but does not close the channel, and carries a centrally tapped boss 25 which supports the upper end of a tie rod 27.

The bottom of the head is provided with an axially, downwardly extending, peripheral flange 29 which has a circumferential groove 31 formed therein.

The bottom is also formed with two circular steps or hubs 33 and 35 which are substantially concentric with the flange 29 and channel 21. A cylindrical, perforated tube 37 has its end fitted over the hub 33 and a cylindrical screen 39 has its end fitted over the hub 35.

A plurality of annular laminae 41 of fiber glass, which are described more fully below, are packed and compressed in the annular space between the tube and screen. A bottom head 43 has a hole 45 therein to receive the tie rod 27 and has an annular ring 47 on the face thereof. The radial corners of the ring are preferably chamfered heavily at 49. The width and diameter of the ring are such that the ring fits in the annular space between the tube and screen. Thus when the lower head is mounted on the tie rod and the nut 51 on the tie rod is drawn up, the ring will compress the pads axially into the space and will also support the screen and tube radially.

A cylindrical cloth tube 53, made preferably of linen, is slipped over the flange 29 and a wire or other tie 55 is applied over the tube at the groove 31 to hold the tube in place on the flange. A linen of about 34 x 40 mesh is preferred.

The tube is preferably provided with a circular wire 57, held in a hem 59, to hold the lower end of the tube against collapse. A cone 61 also of linen cloth is sewn at its base to the cloth tube and has its apex depending.

If desired, the weave of the cloth of the cone may be finer than that of the cylinder for a purpose to be described. I prefer to use a handkerchief linen of about 60 x 66 mesh for the cone.

Figure 3:
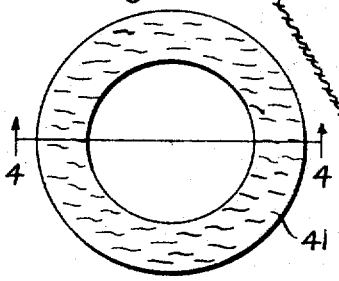
Figure 3 is a plan view of a fiber glass ring such as is used in the separator element.
Figure 4:
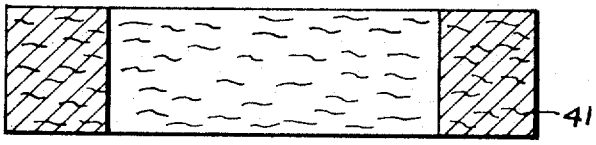
Figure 4 is a sectional view of the ring taken substantially on line 4—4 of Figure 3.

Referring now to Figures 3 and 4, the anular laminae 41 are made from a pad of fiber glass. The fibers are preferably bonded with a phenol formaldehyde resin. I prefer to use a pad having a thickness of about one inch and weighing approximately one half pound a square yard. The general direction of the fibers is substantially horizontal in this pad and the annular elements are cut from the pad by a vertically moving tool so that the fibers are disposed substantially transversely of the element.

The elements are then piled in the space between the tube and screen and compressed therein until they have a thickness of about five hundredths of an inch.

OPERATION

The fuel containing water which is so finely divided that it apears milky or cloudy in a glass, is forced under pressure into the inlet 15 of the tank 1 so that it will pass down through the conduit 21 in head 16 into the separator cartridge 13, radially outwardly through the tube 37, the compressed annular elements 41 and the screen 39 into the space between the screen and the linen bag.

The water is separated from the fuel and coalesces into relatively large drops which tend to settle in the space. However, the fuel is flowing at a considerable velocity so that the drops tend to be carried along with the stream of fuel until they contact the linen tube where they tend to merge and follow down the inside wall of the tube into the cone. The latter is preferably made of a finer material than the cloth tube so that water will collect in the apex of the cone from which it will flow as a stream, through the relatively quiescent body of fuel into the bottom of the tank where it will collect and can be drawn off through drain 4 or by any other suitable means.

The water free fuel passes through the line tube 53 into the tank and is discharged through the outlet 3.

I have found that it is highly advantageous to pass the fuel and water mixture in directions parallel to the general run of fibers rather than transversely thereof, as for instance, from face to face of the pad. A much greater flow rate is obtained for a given differential pressure and the water removal funtion is not materially affected.

I have also found that the resin bonded fiber glass has distinct advantages over plain, unbonded fiber glass. It is more stable and more easy to work and handle.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A water-fuel separator comprising a tank having *a fuel* inlet and *a fuel* outlet, [conduits, a] *said* fuel outlet [connected to] *being disposed in* the upper portion of said tank and a water [outlet connected to the bottom] *drain disposed in the lower* portion of said tank, a deck plate disposed substantially horizontally in said tank to prevent communication between said [conduits] *fuel inlet and fuel outlet,* [means defining a port in the plate,] a water and fuel separating cartridge connected to the plate [and having an inlet communicating with said port], *said plate having a port therein whereby a mixture of water and fuel may flow into the cartridge from said fuel inlet,* said cartridge comprising resin-bonded fibrous filter material [disposed in the path of the mixture of water and fuel flowing from said inlet] for coalescing [the] particles of water in the fuel into drops [as the same pass] *when a mixture of water and fuel passes* therethrough, and straining means disposed externally of said cartridge to receive the mixture [of fuel and water drops] issuing from said separating cartridge for retaining the water drops [but passing the fuel] *so that they may flow downwardly toward the lower portion of the tank while allowing the fuel to flow through the straining means to the fuel outlet.*

2. A water-fuel separator comprising a tank having *a fuel* inlet and *a fuel* outlet, [conduits, a] *said* fuel outlet [connected to] *being disposed in* the upper portion of said tank and a water [outlet connected to the bottom] *drain disposed in the lower* portion of said tank, a deck plate disposed substantially horizontally in said tank to prevent communication between said [conduit] *fuel inlet and fuel outlet,* [means defining a port in the plate] *said plate having a port therein,* a water and fuel separating cartridge disposed in the tank[,] *and* connected to the plate [and], *said cartridge* having an [inlet communicating with the discharge side of] *opening for receiving a mixture of water and fuel through* said port, said cartridge comprising a compressed[,] bonded fiber glass pack for coalescing [the] particles of water in the fuel into drops [as the same pass] *when a mixture of water and fuel passes* therethrough, and straining means disposed externally of said cartridge to receive the mixture [of fuel and water drops] issuing from said separating cartridge for retaining the water drops but passing the fuel *so that the water drops may flow toward the drain and the fuel towards the fuel outlet.*

3. A water-fuel separator comprising a tank having *a fuel* inlet and a fuel outlet, [conduits, a] *said* fuel outlet [connected to] *being disposed in* the upper portion of said tank and a water [outlet connected to the bottom] *drain disposed in the lower* portion of said tank, a deck plate disposed substantially horizontally in said tank to prevent communication between said [conduits] *fuel inlet and fuel outlet,* [means defining a port in the plate] *said plate having a port therein,* a water and fuel separating cartridge [connected] *supported with respect* to the plate and having an inlet [communicating with] *for receiving a mixture of water and fuel through* said port, said cartridge comprising resin-bonded fibrous filter material for coalescing [the] particles of water in the fuel into drops [as the same pass] *when a mixture of water and fuel passes* therethrough, and straining means disposed externally of said cartridges to receive the mixture [of fuel and water drops] for retaining the water drops but passing the fuel *so that the water drops may flow toward the drain and the fuel toward the fuel outlet,* said straining means comprising a bag surrounding but spaced from the [coalescing means] *fibrous filter material* and [terminating adjacent the bottom] *extending toward the lower portion* of said tank.

4. A water-fuel separator comprising a tank having *a fuel* inlet and *a fuel* outlet, [conduits, a] *said* fuel outlet [connected to] *being disposed in* the upper portion of said tank and a water [outlet connected to the bottom] *drain disposed in the lower* portion of said tank, a deck plate disposed substantially horizontally in said tank to prevent communication between said [conduits] *fuel inlet and fuel outlet,* [means defining a port in the plate] *said plate having a port therein,* a water and fuel separating cartridge connected to the plate, [and] *said cartridge* having an [inlet communicating with] *opening for receiving a mixture of water and fuel through* said port, said cartridge comprising resin-bonded fibrous filter material for coalescing [the] particles of water in the fuel into drops [as the same pass] *when a mixture of fuel and water passes* therethrough, and straining means disposed externally of said cartridge to receive the mixture [of fuel and water drops] for retaining the water drops but passing the fuel *so that the water drops may flow toward the drain and the fuel toward the fuel outlet,* said straining means comprising a linen bag surrounding but spaced from the [coalescing means] *fibrous filter material* and terminating in a depending converging tip portion, adjacent the [bottom] *lower portion* of said tank.

5. A water-fuel separator comprising a tank having *a fuel* inlet and *a fuel* outlet, [conduits, a] *said* fuel outlet [connected to] *being disposed in* the upper portion of said tank and a water [outlet connected to the bottom] *drain disposed in the lower* portion of said tank, a deck plate disposed substantially horizontally in said tank to prevent communication between said [conduits] *fuel inlet and fuel outlet,* [means defining a port in the plate] *said plate having a port therein,* a water and fuel separating cartridge [connected to the plate] *mounted in the tank* and having an inlet [communicating with] *for receiving a mixture of water and fuel through* said port, said cartridge comprising compressed, phenol formaldehyde resin-bonded fiber glass filter material for coalescing [the] particles of water in the fuel into drops [as the same pass] *when a mixture of water and fuel passes* therethrough, and straining means disposed externally of said cartridge to receive the mixture [of fuel and water drops] for retaining the water drops but passing the fuel *so that the water drops may flow toward the drain and the fuel toward the fuel outlet.*

6. A water and fuel separator cartridge comprising a head[,] *having* an inlet [conduit] therein, a plurality of [annular] resin-bonded fiber glass laminae *provided with openings therein,* means for supporting said laminae in compressed, coaxial, stacked relation on said head with the openings in communication with said [conduit] *inlet,* a linen bag having an open end, means for supporting one end of said bag on the head[,] to enclose said laminae but in spaced relation thereto, the opposite[,] closed end of the bag being formed to converge away from said head toward a single point.

7. A water and fuel separator cartridge comprising a head[,] *having* an inlet [conduit] therein, a plurality of [annular] resin-bonded fiber glass laminae *provided with openings therein,* means for supporting said laminae in compressed, coaxial, stacked relation on said head with the openings in communication with said [conduit] *inlet,* a cloth bag having an open end, means for supporting one end of said bag on the head[,] to enclose said laminae but in spaced relation thereto, the opposite[,] closed end of the bag being formed to converge toward a single point and [a hoop attached to] *means cooperating with* said bag adjacent the base of said converging end *to maintain the bag in a stable condition.*

8. A water and fuel separator cartridge comprising a head[,] *having* an inlet [conduit] therein, a plurality of [annular,] phenol formaldehyde resin-bonded fiber glass laminae *provided with openings therein,* means for supporting said laminae in compressed, coaxial, stacked relation on said head with the openings in communication with said [conduit] *inlet,* a cloth bag having an open end, means for supporting one end of said bag on the head[,] to enclose said laminae but in spaced relation thereto, the opposite[,] closed end of the bag being formed to converge toward a single point, said converging end of the bag being formed of a cloth having a weave which is close enough to restrain the water collected therein except adjacent the point of convergence.

9. In a water and fuel separator for removing water from liquid fuels containing water and comprising a container having an inlet chamber and an outlet chamber through which said fuel flows, cartridge means arranged in said container [between said inlet chamber and said outlet chamber and] through which said liquid fuel containing water is passed to strip the water therefrom *as the fuel flows from the inlet chamber to the oulet chamber,* said cartridge [comprising] *means having* an inlet [conduit] communicating with said inlet chamber of the container, *said cartridge means including* a pad of glass fibers bonded together in a substantially free state and subsequently compressed with a number of similar pads [into said cartridge], top and bottom wall means retaining said pads of glass fibers in place, said fiber glass when compressed forming a compact porous mass, said [pads] *mass* of glass fibers being arranged in the cartridge *means* so that *a* fuel and water mixture flows from said inlet chamber and through said [pad] *mass* of glass fibers substantially parallel to the general run of the fibers, and an outer perforated wall means for enclosing said [pads] *mass* of glass fibers, *and outlet means whereby the stripped water may be removed from the container.*

10. [In a water and fuel] *A* separator for removing water from liquid fuels [containing water, as in claim 9, and] comprising a container having an inlet *opening* and *an* outlet opening, a cartridge [for arrangement] *arranged* in said container between the inlet and outlet openings, *said cartridge having an inlet* [thereof and through which said cartridge comprising an inlet conduit] communicating with the inlet [side] *opening* of said container, *said cartridge including* a pad of glass fibers bonded together *with a phenol formaldehyde resin* in a substantially free state and subsequently compressed with other similar pads [into said cartridge] *to form a compact porous mass* through which said liquid fuel is adapted to flow and strip the water therefrom, [said fiber glass being bonded with phenol formaldehyde resin, said cartridge forming a compact porous mass through which the fuel and water mixture is passed to strip the water therefrom.] *and outlet means whereby the stripped water may be removed from the container.*

11. In a water and fuel separator for stripping water from liquid fuels containing the same, a cartridge *having an inlet therein and* comprising [an inlet conduit,] a mass of fiber glass bonded together in a substantially free state, and means for supporting said mass in the path of *the* liquid *which is adapted to flow through said inlet* [flowing from said conduit], said mass of fiber glass in the free state being bonded with resin and compressed to approximately 1/20 of its free thickness.

12. In a water and fuel separator for stripping water from liquid fuels containing the same, a cartridge *having an inlet therein and* comprising [an inlet conduit,] a mass of resin-bonded fiber glass laminae, means for supporting said laminae edgewise in the path of liquid *adapted to flow* [flowing] therethrough, said resin-bonded fiber glass laminae being compressed to approximately 1/20 of its free thickness.

13. In a water and fuel separator for stripping water from liquid fuels containing the same, a cartridge *having an inlet therein and* comprising [an inlet conduit,] a hollow mass of resin-bonded fiber glass, [and] means for supporting said mass with its interior in *a* posiiton to receive the liquid *which is adapted to flow* [flowing] from said [conduit, said resin-bonded fiber glass being compressed to approximately 1/20 of its free thickness] *inlet,* a strainer disposed around said cartridge, means for supporting said strainer exteriorly of the mass to receive the effluent from said mass for collecting the separated water, said strainer [extending below said mass] *adapted* to conduct said water downwardly and out of the stream of effluent from the mass.

References Cited in the file of this patent or the original patent

UNITED STATES PATENTS

| | | |
|---|---|---|
| 987,114 | Cottrell | Mar. 21, 1911 |
| 994,377 | Cottrell | June 6, 1911 |
| 1,179,157 | Braun | Apr. 11, 1916 |
| 1,218,738 | Zahm | Mar. 13, 1917 |
| 1,642,864 | Williams | Sept. 20, 1927 |
| 1,787,577 | Hills | Jan. 6, 1931 |
| 1,823,171 | Hele-Shaw et al. | Sept. 15, 1931 |
| 1,947,709 | Garrison et al. | Feb. 20, 1934 |
| 1,974,235 | Cammen | Sept. 18, 1934 |
| 2,103,572 | Wells | Dec. 28, 1937 |
| 2,196,821 | Arnold | Apr. 9, 1940 |
| 2,334,263 | Hartwell | Nov. 16, 1943 |
| 2,359,386 | Reinsch | Oct. 3, 1944 |
| 2,412,841 | Spangler | Dec. 17, 1946 |
| 2,626,709 | Krieble | Jan. 27, 1953 |
| 2,657,808 | Mankin | Nov. 3, 1953 |

FOREIGN PATENTS

| | | |
|---|---|---|
| 425,409 | Great Britain | Mar. 7, 1935 |
| 492,956 | Great Britain | Sept. 26, 1928 |